United States Patent
Schütt et al.

(10) Patent No.: US 6,612,641 B2
(45) Date of Patent: Sep. 2, 2003

(54) VEHICLE DOOR AND PROCESS FOR MANUFACTURING SAME

(75) Inventors: Stephan Schütt, Aschaffenburg (DE); Nick Morbach, Aschaffenburg (DE); Sven Ludwig, Haibach (DE); Steffen Karl, Frammersbach (DE)

(73) Assignee: Acts GmbH & Co. KG (DE)

( * ) Notice: Subject to any disclaimer, the term of this patent is extended or adjusted under 35 U.S.C. 154(b) by 0 days.

(21) Appl. No.: 10/009,793

(22) PCT Filed: Apr. 6, 2001

(86) PCT No.: PCT/EP01/03977
§ 371 (c)(1),
(2), (4) Date: Dec. 3, 2001

(87) PCT Pub. No.: WO01/76900
PCT Pub. Date: Oct. 18, 2001

(65) Prior Publication Data
US 2003/0097796 A1 May 29, 2003

(30) Foreign Application Priority Data
Apr. 12, 2000 (DE) .......................................... 100 18 186

(51) Int. Cl.⁷ .................................................. B60J 3/00
(52) U.S. Cl. ................. 296/152; 296/146.1; 296/146.6; 296/146.9
(58) Field of Search ............................. 296/152, 146.1, 296/146.5, 146.6, 146.9; 49/502, 506

(56) References Cited

U.S. PATENT DOCUMENTS

| | | | | |
|---|---|---|---|---|
| 4,766,025 A | * | 8/1988 | Sanok et al. ................. | 249/142 |
| 4,769,651 A | * | 9/1988 | Meyer ........................ | 347/230 |
| 4,845,894 A | * | 7/1989 | Herringshaw et al. ... | 296/146.2 |
| 4,945,682 A | * | 8/1990 | Altman et al. ........... | 296/146.5 |
| 4,949,508 A | * | 8/1990 | Elton ....................... | 296/146.7 |
| 5,000,990 A | * | 3/1991 | Freeman ..................... | 264/138 |
| 5,040,334 A | * | 8/1991 | Dossin et al. ................. | 49/502 |
| 5,532,065 A | * | 7/1996 | Gubitz et al. ............ | 428/308.4 |
| 5,577,794 A | * | 11/1996 | Gandhi et al. .......... | 296/146.6 |
| 5,584,144 A | * | 12/1996 | Hisano ..................... | 296/146.5 |
| 5,787,645 A | * | 8/1998 | Heim et al. .............. | 296/146.5 |
| 5,820,191 A | * | 10/1998 | Blakewood et al. ........ | 296/152 |
| 5,857,732 A | * | 1/1999 | Ritchie ........................ | 49/502 |
| 5,868,455 A | * | 2/1999 | Springer et al. ......... | 296/146.1 |

(List continued on next page.)

FOREIGN PATENT DOCUMENTS

| | | |
|---|---|---|
| EP | 0 370 342 | 5/1990 |
| EP | 0 495 712 | 7/1992 |
| EP | 0 773 126 | 5/1997 |

*Primary Examiner*—D. Glenn Dayoan
*Assistant Examiner*—Lori L Coletta
(74) *Attorney, Agent, or Firm*—McGlew and Tuttle, P.C.

(57) ABSTRACT

A vehicle door with a door casing includes an inside door panel (1) of a shell-like design. The inside door panel (1) is closed by a replaceable outside door shell (2) toward the outside of the vehicle door. To achieve that moisture is prevented in a simple manner from entering the interior space of the vehicle from the door casing, the inside door panel (1) is connected from its side facing the outer shell (2) to a plastic support part. The plastic part is provided with fastening elements (13), which carry the door components to be arranged in the door casing. The structural elements (9, 10, 10') of the vehicle door, which protrude into the interior space of the vehicle, are fastened to the inside door panel (1). The openings (5, 6) necessary in the inside door panel (1) for the structural elements (9, 10, 10') protruding into the interior space of the vehicle are sealed, e.g., by the plastic support part (8). The assembly and disassembly of the door components located in the interior space of the door casing are performed from the outside of the door (e.g., through an outside door panel which can be pulled up).

10 Claims, 4 Drawing Sheets

U.S. PATENT DOCUMENTS

| | | | | |
|---|---|---|---|---|
| 5,927,020 A | * | 7/1999 | Kobrehel | 49/502 |
| 5,944,373 A | * | 8/1999 | Seksaria et al. | 296/146.5 |
| 6,036,255 A | * | 3/2000 | Lester et al. | 296/146.1 |
| 6,086,139 A | * | 7/2000 | Heim et al. | 296/146.5 |
| 6,103,348 A | * | 8/2000 | Scharrenberg et al. | 428/121 |
| 6,176,542 B1 | * | 1/2001 | Gooding et al. | 296/146.5 |
| 6,185,873 B1 | * | 2/2001 | Saito | 49/502 |
| 6,226,927 B1 | * | 5/2001 | Bertolini et al. | 49/502 |
| 6,301,835 B1 | * | 10/2001 | Pfeiffer et al. | 296/146.5 |
| 6,354,652 B1 | * | 3/2002 | Arquevaux et al. | 296/146.1 |

* cited by examiner

VEHICLE DOOR AND PROCESS FOR MANUFACTURING SAME

FIELD OF THE INVENTION

The present invention pertains to a vehicle door with a door casing as well as to a process for manufacturing such a vehicle door.

BACKGROUND OF THE INVENTION

In prior-art vehicle doors, the door casing is formed, on its side facing the interior space of the vehicle, by a massive inside door panel of a shell-like design, which is closed toward the outside of the vehicle door by an outside door shell, which is connected to the inside door panel, e.g., by beading and bonding. The door components located inside the door, such as the power window motor, the side impact protection support, lines and linkages for the lock and its connection to the door handle, etc., are usually accessible from the inside of the vehicle through corresponding openings of the inside door panel. These openings are covered by a supporting inside door lining, which comprises in turn structural parts such as the arm rest, the door closer handle or the bracket for the inner activation of the door, and must therefore be designed as a rigid support part.

The drawback of such prior-art doors is, among other things, that the various openings present in the inside door panel must be sealed by means of additional sealing strips in a relatively complicated manner in order to prevent water entering the door casing via, e.g., the window gap in case of heavy rain from also entering the interior space of the vehicle.

A lightweight component with excellent strength properties, which can also be used in motor vehicles and comprises a shell-like base body, in the interior space of which reinforcing ribs consisting of plastic molded integrally are provided, has been known from EP 0 370 342. The reinforcing ribs are connected to the base body at discrete connection points via openings in the base body, through which the plastic extends and projects over the surfaces of the openings.

SUMMARY AND OBJECTS OF THE INVENTION

The basic object of the present invention is to provide a vehicle door in which moisture is prevented with certainty and in a simple manner from entering the interior space of the vehicle from the door casing. Another object of the present invention is to disclose a process for manufacturing such a vehicle door.

The present invention is based essentially on the idea of connecting the inside door panel from its side facing the outer shell to a plastic support pail which is provided with fastening elements which support the door components to be arranged in the door casing and of fastening the structural elements protruding into the interior space of the vehicle to the inside door panel. The assembly and disassembly of the door components located in the interior space of the door casing is performed, unlike in prior-art vehicle doors, from the outside of the door (e.g., through an outside door panel that can be pulled up).

In such a vehicle door, in which the components located in the door casing are accessible from the outside, the openings in the inside door panel can be kept small and are used essentially only to fasten the structural elements protruding into the interior space of the vehicle. These openings can be sealed against moisture in a simple manner.

Another essential advantage of the vehicle door according to the present invention is that due to the use of the plastic support part, the thickness of the inside door panel can be selected to be substantially smaller than in prior-art shell-type doors, because corresponding critical areas of the inside panel can be reinforced by plastic during the injection molding process.

The door structure according to the present invention can be embodied in a simple manner by arranging the plastic support part, after preassembly of the plastic structural parts on the inside panel, on the shell-like inside panel, which is, e.g., a deep-drawn panel, by injection molding together with the fastening elements for the door components. The support part is connected to the inside panel at discrete connection points via openings in the inside panel, through which the plastic extends and projects over the surfaces of the openings.

To obtain the most lightweight vehicle door possible with good strength properties, it proved to be advantageous for the plastic support part to be provided, at least in some areas, with reinforcing ribs arranged in a honeycomb pattern, similarly to what is disclosed in EP 0 370 342 A2, which was mentioned at the beginning.

Since all the structural elements protruding into the interior space of the vehicle are fixed to the inside door panel rather than to the inside door lining, a conventional inside door lining can either be done away with altogether or it is sufficient for aesthetic reasons to use a non-self-supporting facing for covering the fastening openings for the plastic support part or for the arm rest, the door closer handle, etc.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
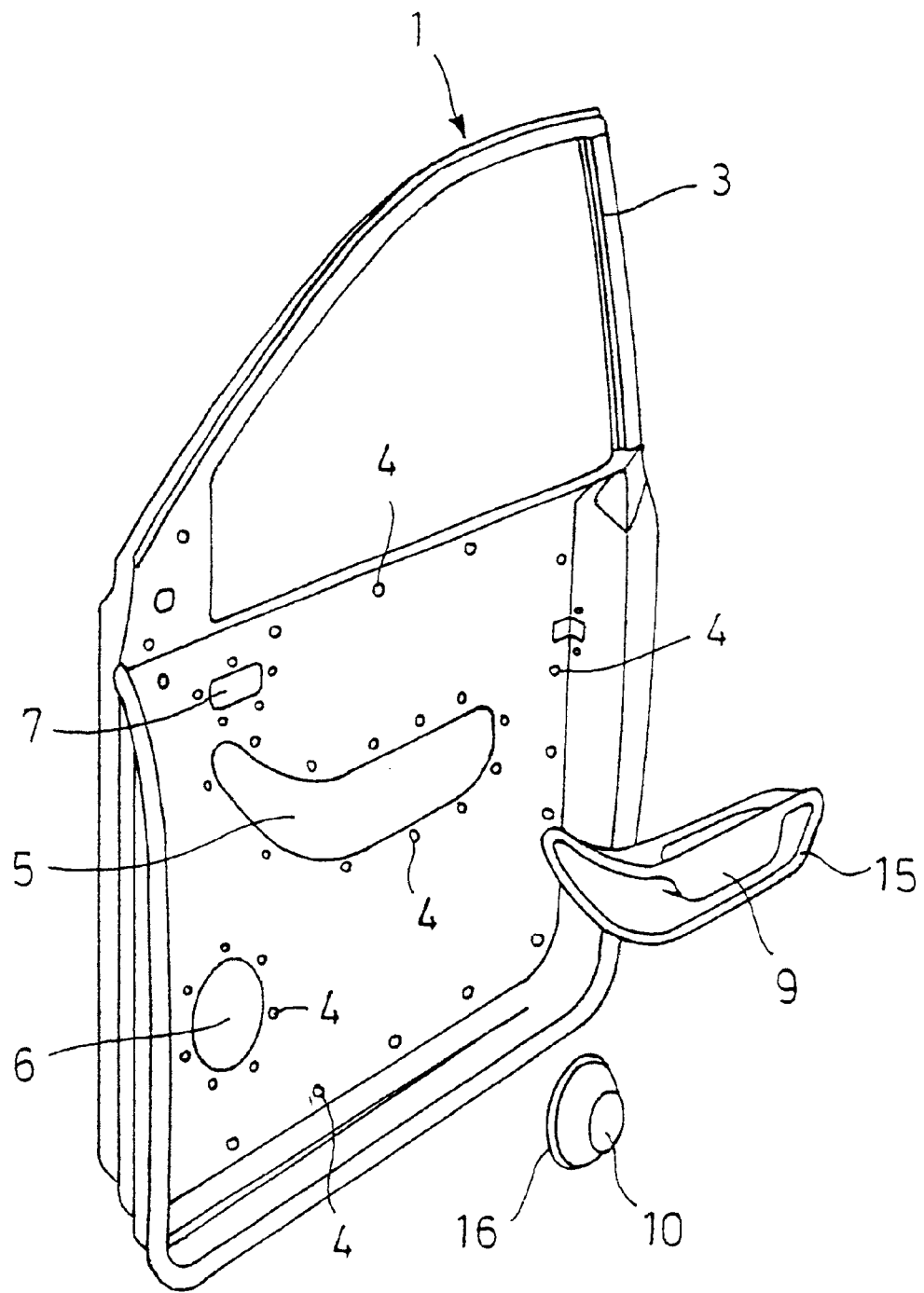
FIG. 1 is a perspective view of an inside door panel of a shell-like design with a plurality of door components fastened thereto when viewed from the outside before the plastic injection molding operation for introducing a plastic support part.
Figure 2:
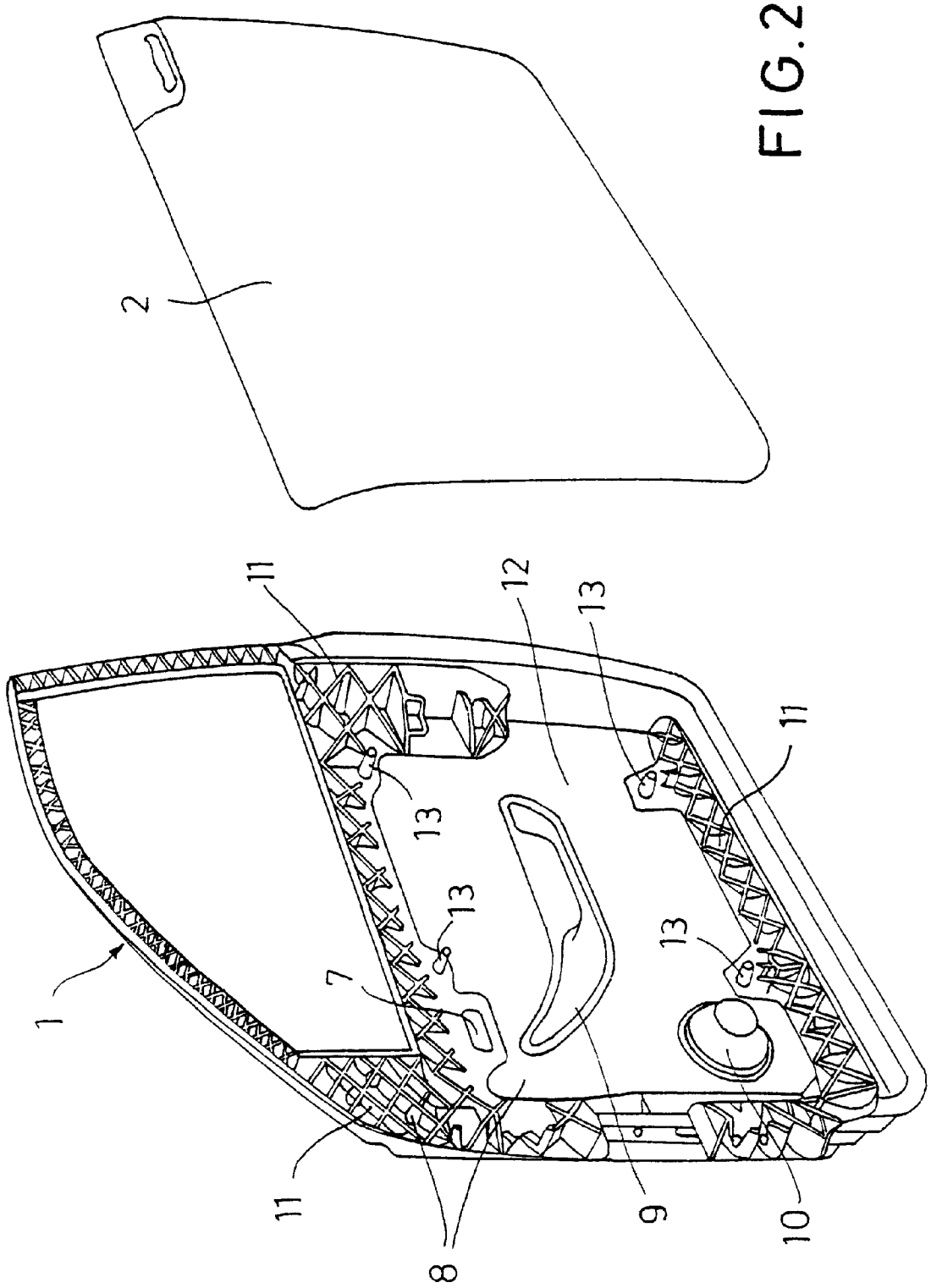
FIG. 2 is a perspective view of the inside door panel corresponding to FIG. 1 after the introduction of the plastic support part.

Referring to the drawings in particular, an inside door panel of a shell-like design both forms the side of a door casing facing the interior space of the vehicle, which door casing is closed by an outside door shell 2 (FIG. 2), and comprises a window frame section 3. The inside door panel is designated by 1 in FIGS. 1 through 3. A number of openings 4–7 are provided in the inside door panel 1. The openings 4 are used to fasten a plastic support part 8 (FIG. 2), the opening 5 is used to pass through an arm rest 9 with the door closer handle, and the opening 6 is an opening for a loudspeaker 10. Finally, the opening 7 is used to pass through the inside handle, not shown.

After fixing the arm rest 9 and the loudspeaker 10, a suitable plastic (e.g., glass fiber-reinforced polyamide 6, propylene, etc.) is injection molded by means of a corresponding molding die into the shell-like inside door panel 1 by means of an injection molding machine. The molding die is selected to be such that the plastic support part 8 obtained after the injection molding operation has reinforcing ribs arranged in a honeycomb pattern in some areas 11 and continuous surfaces in some areas 12. In addition, the molding die is selected to be such that fastening elements 13, e.g., screw domes for side impact protection bumpers, etc., are formed on the plastic support part 8.

Figure 3:
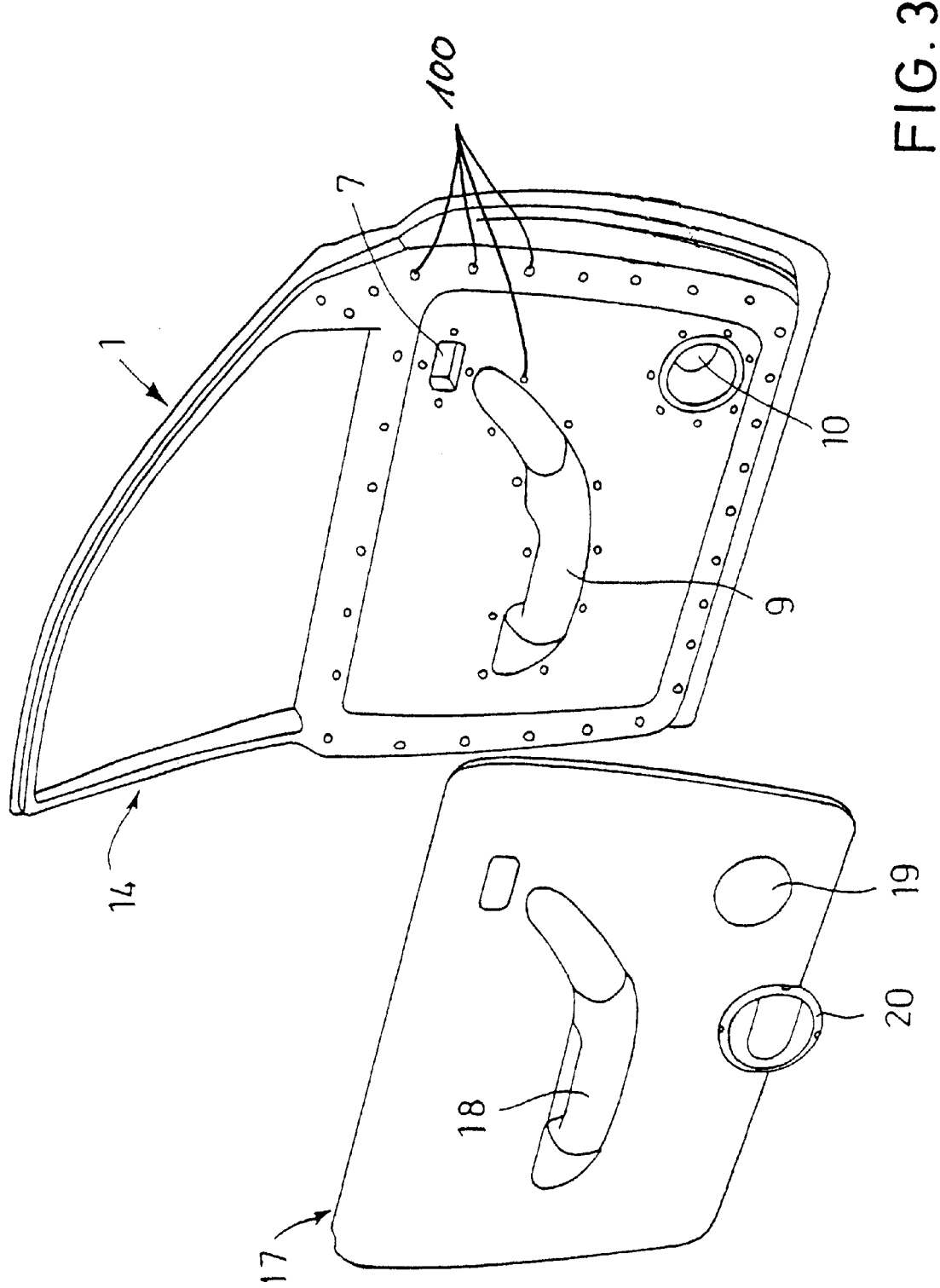
FIG. 3 is a perspective view of the inside door panel corresponding to FIG. 2 when viewed from the interior space of the corresponding motor vehicle before the fastening of an inside door lining.

The pasty plastic is pressed during the injection molding operation through the openings 4 (FIG. 1) and into the bead-like indentations, not shown, which are arranged around the respective opening 4 on the reverse side 14 of the inside door panel 1 (FIG. 3). This provides plastic fastening portions 100. The plastic fastening portions 100 extend through the openings 4 and over surfaces of the openings on a reverse side. The plastic support part 8 is thereby firmly connected to the inside door panel 1 after the injection molding operation.

At the same time, the arm rest 9 and the loudspeaker 10 are fastened to the inside door panel 1 during the injection molding operation. These structural elements have edge areas 15, 16 for this purpose, which prevent sliding through the corresponding openings 5 and 6 into the interior space of the vehicle, on the one hand, and, on the other hand, are partially covered by the plastic support part 8 after the injection molding operation. As a result, these structural elements are pressed against the inside door panel 1 and fastened thereto. The gap-like openings possibly left between the respective structural element and the opening are closed by the corresponding plastic composition during the injection molding operation.

The molding die is, finally, selected to be such that the opening 7 provided for the inner actuating means is left open during the injection molding operation.

After the plastic support part 8 fastened in the inside door panel 1 has been prepared, the corresponding components of the door, such as the side impact protection support, the shaft strip, the window guide rail, the power window motor, electric lines, etc., are arranged at the fastening elements 13 of the plastic support part 8 which are provided for this purpose. The outside door shell 2 (FIG. 2) is then, e.g., pushed over the inside door panel 1 and the outer door handle is fastened.

Finally, an inside door lining 17 (FIG. 3) may also be fastened to the inside door panel 1 if desired. This inside door lining has a bulge 18 for the arm rest 9 as well as an opening 19 for the loudspeaker, wherein the opening 19 can be closed by a separate loudspeaker screen 20.

The present invention is, of course, not limited to the above-described exemplary embodiment. For example, the plastic support part does not obligatorily have to have ribbed areas. In addition, a plurality of plastic support parts separated from one another may also be provided in the shell-like area of the inside door panel.

In addition, not all the door components arranged in the door casing have to be obligatorily fastened to fastening elements of the plastic support part. It is also conceivable to provide a corresponding fastening on the inside door panel (e.g., at metallic screw domes which are surrounded by the plastic support part) for highly stressed components, such as the side impact protection bumpers.

Furthermore, e.g., additional structural elements protruding into the interior space of the vehicle, such as a storage compartment, an ashtray or the grip shell of the inner actuating means, etc., may also be fastened to the inside door panel by the plastic support part during the injection molding. If a separate reinforcement of the window frame is not possible, the integral injection molding of plastic ribs may be eliminated in this area.

Furthermore, it has proved to be particularly advantageous not to prefabricate the structural elements protruding into the interior space of the vehicle and not to fasten them by the injection molding of the plastic support part, but to manufacture the structural elements simultaneously with the manufacture of the plastic support part.

Figure 4:
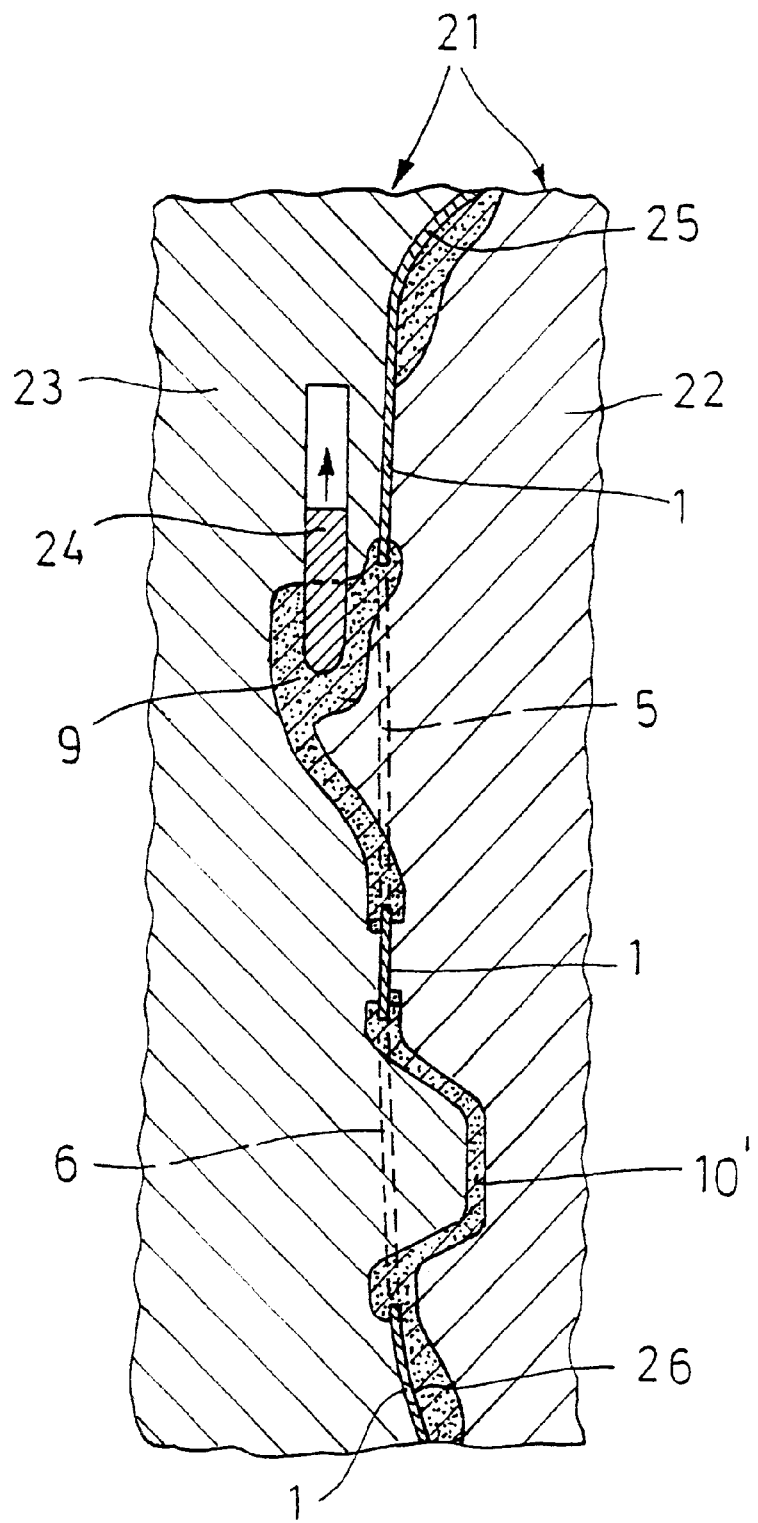
FIG. 4 is a perspective view of an inside door panel located in the injection molding die after the injection molding of the door components protruding into the interior space of the vehicle.

This operation is indicated in FIG. 4, which shows an inside door panel 1 located in an injection molding die 21 with the die halves 22 and 23 after the injection molding. The inside door panel 1 has again openings designated by 5 and 6 for an arm rest 9 and for a loudspeaker mount 10'.

After closing the two halves 22, 23 of the die, die cavities which correspond to the structural elements 9 and 10' and cover the edge areas of the openings 5 and 6 of the inside door panel 1 at least in partial areas are left in the parting plane of the die halves. When the plastic is subsequently injected into the die cavities via a corresponding sprue system, plastic is injected around the edge areas of the openings 5, 6, so that the structural elements 9, 10' are held by the inside door panel 1 after the removal from the mold, and the openings are sealed against moisture.

For example, a slide designated by 24 in FIG. 4 may be used to introduce an indentation into the arm rest.

As is indicated in FIG. 4, additional die cavities are located in the area of highly stressed sections 25, 26 of the inside door panel 1, so that these sections are also reinforced by plastic after the injection molding.

While specific embodiments of the invention have been shown and described in detail to illustrate the application of the principles of the invention, it will be understood that the invention may be embodied otherwise without departing from such principles.

What is claimed is:

1. A vehicle door with a door casing, comprising;
   an inside door panel on a door side facing an interior space of the vehicle, said inside door panel including sheet material having a shell form;
   a replaceable outside door shell, said door panel having a shell form being closed toward the outside of the vehicle door by said replaceable outside door shell;
   at least one plastic support part connected by plastic fastening portions to said inside door panel at discrete connection points via openings defined by said inside door panel, said plastic fastening portions extending from a side through said openings with said plastic fastening portions passing through and projecting over surfaces of said openings on a reverse side, said fastening portions being injection molded integrally with said plastic support part on said door panel on a side facing said outside door shell;

fastening elements for door components arranged in the door casing, said fastening elements being provided at said plastic support part;

interior vehicle space structural elements which protrude into the interior space of the vehicle or are accessible from the interior space of the vehicle, said structural elements being fastened to said inside door panel in an area of corresponding structural element openings of said inside door panel so that no moisture can enter the interior space of the vehicle from the door casing.

2. A vehicle door in accordance with claim 1, wherein said plastic support part has reinforcing ribs arranged in a honeycomb pattern.

3. A vehicle door in accordance with claim 1, wherein said inside door panel has side walls, and the dimensions of said plastic support part are selected to be such that said plastic support part is limited on a side by said side walls.

4. A vehicle door in accordance with claim 1, wherein said fastening portions injection molded integrally on said plastic support part comprise screw domes.

5. A vehicle door in accordance with claim 1, further comprising a dimensionally stable non-self-supporting inside door lining arranged on a side facing the interior space of the vehicle for covering the structural elements protruding into the interior space of the vehicle.

6. A vehicle door in accordance with claim 1, wherein said structural elements fastened to said inside door panel have edge areas in contact with a side of said inside door panel facing said plastic support part, said edge areas covering said corresponding openings.

7. A process for manufacturing a vehicle door with door casing, the process comprising the steps of:

providing an inside door panel on a door side facing an interior space of the vehicle, said inside door panel including sheet material having a shell form;

providing a replaceable outside door shell;

closing said inside door panel having a shell form toward the outside of the vehicle door with said replaceable outside door shell;

injection molding at least one plastic support part to connect the plastic support part by plastic fastening portions to said inside door panel at discrete connection points via openings defined by said inside door panel, said plastic fastening portions extending from a side through said openings with said plastic fastening portions passing through and projecting over surfaces of said openings on a reverse side, said fastening portions being injection molded integrally on said plastic support part, said plastic support part being provided on a side facing said outside door shell;

providing fastening elements for the door components arranged in the door casing, said fastening elements being provided at said plastic support part and interior vehicle space structural elements which protrude into the interior space of the vehicle or are accessible from the interior space of the vehicle;

fastening structural elements to said inside door panel in an area of corresponding structural element openings of said inside door panel so that no moisture can enter the interior space of the vehicle from the door casing;

introducing said structural elements protruding into the interior space of the vehicle into said inside door panel, which is provided with said corresponding openings;

provisionally fixing said structural elements;

fastening said structural elements and said plastic support part, formed during the injection molding including injecting plastic into said inside door panel with a corresponding molding die to said inside door panel, wherein the injection pressure is selected to be such that the plastic composition securely seals gap openings that may be present between said corresponding openings and said structural elements.

8. A process for manufacturing a vehicle door with door casing having an inside door panel on a door side facing an interior space of the vehicle, said inside door panel including a sheet of material having a shell form, the process comprising the steps of:

providing a replaceable outside door shell and closing said door panel having a shell form toward the outside of the vehicle door by said replaceable outside door shell;

introducing said inside door panel, which is provided with corresponding openings, into an injection molding die, which comprises at least two die halves and which has, after the closing of said two die halves, die cavities;

subsequently injecting plastic into the die cavities to form at least one plastic support part connected by plastic fastening portions to said inside door panel at discrete connection points via openings defined by said inside door panel, said plastic fastening portions extending from a side through said openings with said plastic fastening portions passing through and projecting over surfaces of said openings on a reverse side, said fastening portions being injection molded integrally on said plastic support part, said plastic support part being provided on a side facing said outside door shell;

providing fastening elements for the door components arranged in the door casing, said fastening elements being provided at said plastic support part;

providing interior vehicle space structural elements which protrude into the interior space of the vehicle or are accessible from the interior space of the vehicle, said structural elements being fastened to said inside door panel in an area of corresponding structural element openings of said inside door panel so that no moisture can enter the interior space of the vehicle from the door casing, said structural elements being produced and fastened to said inside door panel substantially simultaneously with the production and fastening of said plastic support part.

9. A vehicle door in accordance with claim 2, wherein said inside door panel has side walls, and the dimensions of said plastic support part are selected to be such that said plastic support part is limited on a side by said side walls.

10. A vehicle door in accordance with claim 2, wherein said fastening portions injection molded integrally on said plastic support part comprise screw domes.

* * * * *